UNITED STATES PATENT OFFICE.

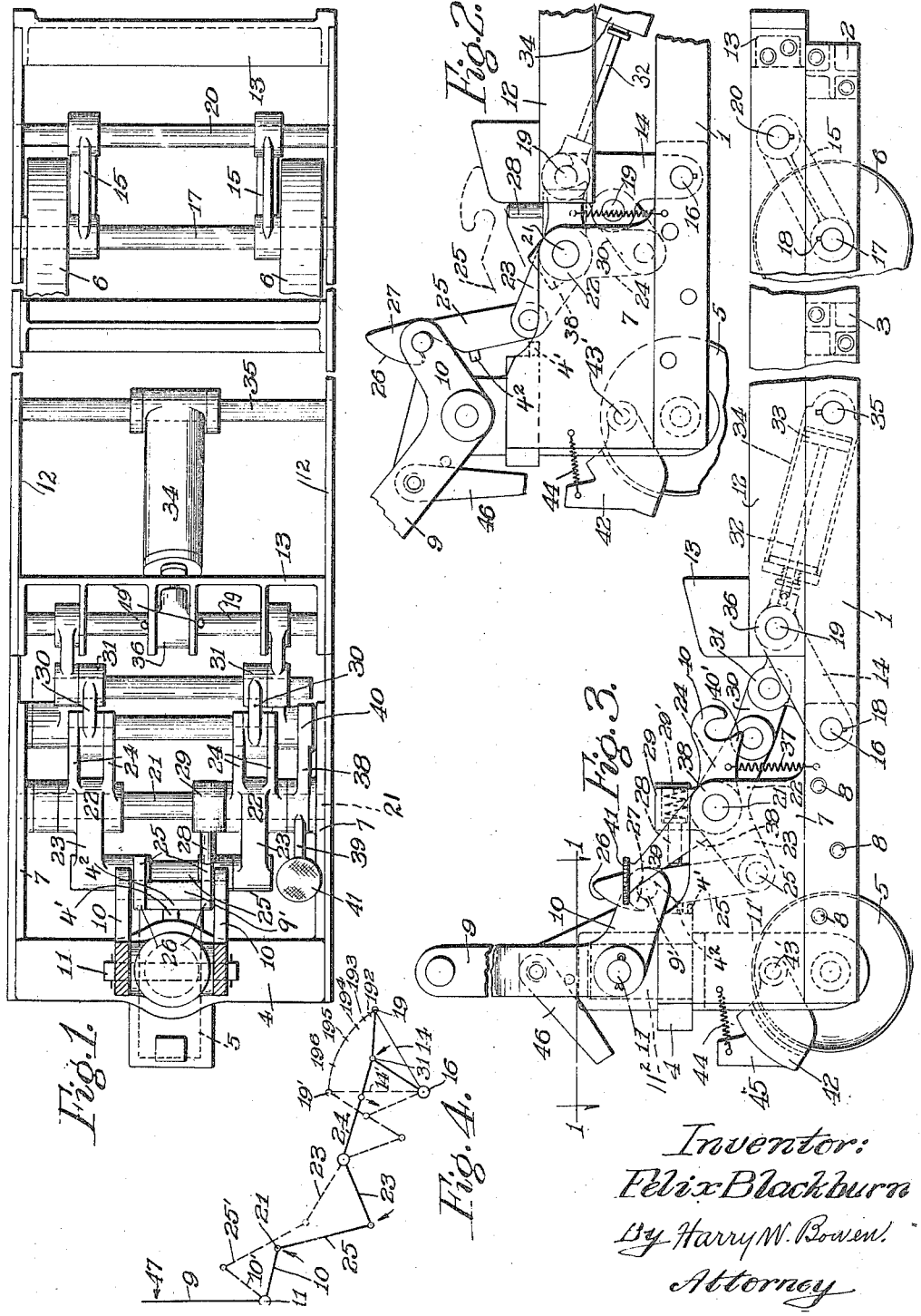

FELIX BLACKBURN, OF FEEDING HILLS, MASSACHUSETTS.

ELEVATING-TRUCK.

REISSUED 1,243,035. Specification of Letters Patent. Patented Oct. 16, 1917.

Application filed July 3, 1916. Serial No. 107,234.

*To all whom it may concern:*

Be it known that I, FELIX BLACKBURN, a subject of the King of Great Britain, and residing at Feeding Hills, county of Hampden, and State of Massachusetts, have invented certain new and useful Improvements in Elevating-Trucks, of which the following is a specification.

This invention relates to improvements in what is known in the trade as elevating trucks. Such trucks comprise, in general, a main frame which is movably supported by means of wheels or casters, usually three, two rear and one front or steering wheel, that are suitably mounted on axles or shafts which extend transversely of the side bars of the main frame of the truck, and a second frame suitably connected to the main frame and designed to be raised and lowered relative to the main frame, and, at the same time maintained in parallel relation to the main frame. The elevating mechanism is usually connected with the handle for raising the second or elevating frame relative to the main frame when a load is to be raised for transportation. In this class of inventions it is the common practice to stack goods, as castings or boxes, of various kinds on what is known as "skids" or platforms and when it is desired to transfer these loaded skids or platforms from one part of a building to another the trucks are pushed under the skids, then, by operating the handle the second frame is lifted, causing the skid with its load to be elevated free from the floor and supported on the truck, whereby the load may be easily transferred from one position to another as desired. These trucks are largely used in loading and unloading cars. The lowering mechanism of the truck comprises devices for readily unlatching the second frame and allowing it to descend by its own weight after being started or pushed slightly rearward by the unlatching mechanism which will be described in the body of the specification; suitable means being provided to regulate the rate of descent of the load, in order to avoid shock or jar.

One of the objects of the present invention is the provision of means for exerting the greatest leverage or lifting effect on the elevating truck when the load is first started from a state of rest and, as the handle is carried forward and downward this leverage gradually diminishes, and, at the end of the travel of the handle the leverage is again increased while the load is traveling in practically a horizontal plane. Another object is that it does not require any operation to engage the handle with the elevating mechanism, all that is required to engage the handle for elevating is to lift the handle in the vertical position and it will automatically latch itself ready for the elevating operation. With these objects in view the invention will be fully described in the specification and particularly pointed out in the claims.

Referring to the drawings:

Figure 1 is a plan view of the truck showing the operating mechanism and with portions of the platform broken away; also a section on the line 1—1 of Fig. 3;

Fig. 2 is a detail side elevational view of a portion of the truck illustrating the operating or lifting mechanism, the elevating frame of the truck being shown in its raised position;

Fig. 3 is a side elevational view of the truck with the elevating frame in its lowered position or initial position, the position of the operating handle being in the position for elevating the lifting or elevating frame; this view illustrates portions of the frames broken away;

Fig. 4 is a diagrammatic view showing in full and dotted lines the position of the elevating mechanism before and after the load is lifted.

Referring to the drawings in detail: The main or lower frame of the truck consists of the side bars 1, end bars 2 and frame head 4 which is rigidly secured to the side bars by riveting or any suitable means as shown at 8. Located in the forward and rear ends of the main frame are the supporting wheels 5 and 6. The frame head 4 includes the depending side plates 7 which are, as stated, secured to the side bars 1 by the rivets 8. The parts 4 and 7 are cast solid in one piece. 9 designates the operating handle which is preferably formed with two L-shaped arms, the shorter arms of the L being indicated at 10 and the pivot at 11 where it is attached to the steering head 11' of the main frame. This steering head comprises the well known construction which includes the cylindrical part $11^2$ which passes through the part 4 of the steering head. The elevating frame comprises a pair of longitudinal bars 12 and transverse end bars 13. This frame is pivotally connected to the main frame by means of the elevating links 14 and 15 the lower ends of the links being pivotally mounted on the rods or shafts 16 and 17 which are rigidly secured against rotation in the side bars 1 of the main frame by means of the keys 18. The upper ends of the elevating links 14 and 15 are connected to the transverse shafts 19 and 20 which shafts are also rigidly secured at their ends to the elevating frame. It will be observed that the links 14 and 15, when in a downward position make any suitable angle with the side frames depending on the distance the elevating frame is to be raised. Extending transversely of the main frame and fixedly secured to the side plates 7 of the head 4 is a shaft 21. Loosely and pivotally mounted on this shaft are two bell crank levers 22 having the oppositely extending arms 23 and 24 which make any suitable angle with each other depending upon the distance the elevating frame is to be elevated. Pivotally connected with the arms 23 is a link 25 by means of the rod 25', said link is formed with hooks 27 at its upper end. The forward upper ends or edges of this link are formed with curved edges 26. The link 25 is normally forced forward by means of the spring actuated plunger 28 which is mounted in the casing 29 having the coil spring 29' therein. This casing is secured in any suitable manner, preferably, it is cast solid with the upper side of one of the bell-crank levers 22 and therefore moves therewith when this lever is rocked into the position shown in Fig. 2. Connected to the arms 24 of the bell crank levers 22 and to the forward elevating links 14 are short links 30 which are attached to the shaft which passes through the bosses 31 of the links 14.

Attached to the shaft 19 in the elevating frame is a piston rod 32 carrying a piston 33 at its lower end. This piston is mounted in the casing 34 which is pivotally connected at its lower end to the shaft 35 of the main frame, which shaft is rigidly secured against rotation in said frame. The forward end of the rod 32 is attached to a recessed block or head 36 which in turn, is pivotally connected to the shaft 19, as clearly shown in Figs. 1 and 3. Pins 19' pass through the shaft 19 on opposite sides of the head and hold them together and when these pins are driven out the shaft 19 can be removed. Pivotally mounted on the fixed shaft 21 is a locking pedal lever 38 which is preferably made bell crank in shape having the forwardly extending arm 39 and the rearwardly extending hook portion 40. This lever is for locking the elevated frame in its raised position. The rearwardly extending hook portion is normally drawn downward by means of the coiled spring 37, but, at the same time permits the shaft 19 to snap into the hook when the elevating frame is raised, as shown in Fig. 2. The hook portion is designed to receive the shaft 19 when the elevating frame is moved upward into the position shown in Fig. 2. The elevating frame is locked by this hook portion and retains said frame in an elevated position. When it is desired to release the elevating frame the operator simply pushes downward on the plate 41 freeing the hook 40 from the shaft 19 against the action of the spring 37. The underside of the hook has a projection 40' which pushes the shaft 19 over the center and thus allows the load to fall by gravity. . The forward wheel 5 is provided with a brake block or shoe 42 which is pivotally connected to the sides of the steering head wheel fork 11' at the point 43'. This shoe is normally held out of contact with the outer surface of the wheel by means of the spring 44 which is attached to an upwardly extending projection 45. When it is desired to use the brake the pendant bar 46 can be unlatched from the handle 9 and allowed to hang in a vertical position so that as the handle 19 is lowered the pendant bar 46 engages the projection 45 and forces the brake shoe downward against the wheel 5 for the purpose of braking the truck should the floor be inclined. When not in use the pendant bar 46 lies flat or is secured to the inside of the handle fork.

Referring now to the operation of the truck: The position of the handle 9 is to be considered as normally standing in the position indicated in Fig. 3. When the operator moves the handle 9 which connects the two L-shaped arms 10 rearwardly the latch bolt or pin 9', engages the inclined surface 26 of the hook 25 forcing this hook rearwardly against the action of the spring of the plunger 28 a sufficient distance until the latch bar 9' snaps into the hook 25 as shown in Fig. 3. The operator next moves the handle 9 forwardly in the direction of the arrow 47 (see Fig. 4). This causes the operating links to assume the dotted line positions shown in Figs. 2 and 4, respectively. The forward movement of the operating handle 9 causes the elevating links 14 and 15 to assume the vertical position shown. The transverse shaft 19 will now engage the locking hook 40 as indicated in Fig. 2. The elevating frame is now raised to the position shown in this figure in which position the frame is locked. During the travel of the links 14 from their full to dotted line position it will be observed that they will be moved into a vertical position at the end of their travel, as shown in Fig. 4 at 14'. The greatest leverage of the system is used to start the load. At starting, the load on the platform or skids is lifted in nearly a vertical direction as indicated in Fig. 4 at $19^2$, its first position. As the handle 9 is moved downward through equal arcs or divisions, it will be found that the leverage required to lift the load gradually decreases from start to finish as shown by the spaces indicated at $19^2$, $19^3$, etc. That is to say, with the movement of the handle 9 through equal arcs, or steps, the upper end of the links 14 and 15 will, as they rise, pass through arcs that are longer and longer, or, in other words, with equal force being exerted on the handle 9 the links 14 and 15 will be swung through longer arcs after starting, as indicated in Fig. 4, at $19^4$, $19^5$, $19^6$, etc. The leverage therefore decreases, the load remaining constant, as the handle 9 is moved from its vertical position downward in the direction of the arrow 47 in Fig. 4. At the beginning, however, as stated, the leverage is the greatest when the greatest leverage is required. The load is then being lifted in almost a vertical direction, but, as the links 14 rise their upper ends will travel in a path that is more nearly horizontal. Less leverage is, of course, needed after starting than at the time of starting from a state of rest. After the load is elevated and held in its locked position by the hook 40 the operating handle 9 stands in its lowest position. In order to unlock the operating handle 9 from the link 25 and leave it free for use in drawing the load, the operator moves the same rearwardly a sufficient distance to cause the link 25 to fall by gravity and assume the dotted line position shown in Fig. 2. It is to be understood that the link 25, after the pin 9' is withdrawn will retain a position to permit the reëngagement of the pin 9' when the handle is to be used to lift another load. This link would be prevented from falling forward too far by the projection 4' on the frame part 4 in order that the pin 9' may readily reëngage the hook link 25. In order to release the load the operator places his foot on the plate 41 which causes the hook arm 40 to be elevated thus releasing the shaft 19 and allowing the load to be pushed or started back by the projection 40'. The regulating mechanism of the cylinder 34, which is preferably filled with oil or some other heavy liquid, serves to allow the load to descend slowly by gravity.

What I claim is:

1. An elevating truck comprising the combination with a main wheeled supporting frame, of a frame pivotally connected thereto and adapted to be elevated with relation to the main frame, an operating handle, bell-crank levers, detachable connecting means between the forward arms of said levers and the handle, connecting means between the other arms of the bell-crank levers and the pivotally connected frame, and means including a bell-crank mounted on the same support as said bell crank levers and having a hook on one arm thereof for retaining the latter frame in an elevated position and for permitting its release when the other arm of the retaining means is operated.

2. An elevating truck comprising in combination, a main frame, an elevating frame pivotally connected to said frame, an operating handle, link devices between the operating handle and the elevating frame, a shaft for supporting one of the links of said devices, devices for connecting said handle to one of the links as the handle is moved rearwardly, means for locking the elevating frame in its raised position, said locking means being pivotally mounted on the said shaft and means for unlocking said handle after the elevating frame is locked when said handle is moved rearwardly again.

3. In an elevating truck the combination with a main frame mounted on wheels, of a second frame pivotally connected to the main frame by rigid one piece links located at the front and rear ends of said frames, links connected to the front links, a pair of bell crank levers pivotally connected to the main frame and having one pair of their arms connected to said forward links by means of the links that are attached to the said last named links, an operating handle with two arms, a bolt connecting said arms and means for detachably connecting the other pair of arms of said bell crank levers to the bolt of said handle.

4. In an elevating truck the combination with a main frame mounted on wheels, of a second frame pivotally connected to the main frame by links located at the front and rear ends of said frames, bell crank levers pivotally connected to the main frame, intermediate links connected to a pair of arms of said levers and to said front links, an operating handle, means for detachably connecting the other arms of said levers to said handle, and means for retaining the last named means in position to engage and lock the handle to said means when said handle is moved rearwardly.

5. An elevating truck comprising in combination with a main frame, of an elevating frame pivotally connected thereto, an operating handle, a pair of bell crank levers, a shaft upon which said levers are loosely mounted, links connecting the arms of said levers to the connection between the elevating frame and the main frame, links connected to the other arms of the bell crank levers, said last named links being formed with hook shaped ends for automatic engagement with the operating handle when the elevating frame is to be raised.

6. In an elevating truck, the combination of a main frame, an elevating frame, an L-shaped operating handle, a fixed shaft, bell crank levers mounted thereon, a hook shaped link connected to one of the arms of each of said levers and normally maintained in position for engagement by the operating handle, links for connecting the other arms of the bell crank levers to the elevating frame, and means for maintaining the latter frame in a raised position.

7. An elevating truck, comprising in combination with a main frame, an elevating frame pivotally connected thereto, operating mechanism for elevating the elevating frame and including link connections between the main and elevating frames, three bell crank levers pivotally mounted in the main frame and a common shaft on which said levers are loosely mounted, two of said levers being connected directly to said links and included in the operating mechanism for raising the elevating frame, the other one of said levers being designed for locking the latter frame in a raised position, and means comprising a handle for operating the elevating mechanism, all constructed and arranged to exert the greatest leverage when the load is first started.

8. An elevating truck comprising in combination with a main frame, an elevating frame pivotally connected thereto, a shaft, a lever mounted thereon, a connecting link between the lever and the said connection between the elevating frame and the main frame, an operating handle, a second link having a hook formed at one end for detachably engaging said handle during the elevating operation and releasable therefrom, said second link being permanently connected to said lever, a device for normally holding the second link in position for engagement by said handle, said device being located on and movable with said lever.

9. The combination in an elevating truck, of a main frame, an elevating frame, links for connecting the frames together, an operating handle having rearwardly extending arms, a bolt connecting the arms, a pair of bell crank levers disposed at the rear of said arms, links each connected at one end to one of the levers and its other end being formed with a hook for engaging said bolt, other links interposed between and connected to said levers and the connecting links between the frames, the pivotal points of connection between the handle and the connecting links between the frames being such that the greatest lifting effect is produced as the operating handle is started from its position of rest.

10. The combination, in an elevating truck, of a main wheel-supporting frame, an elevating frame superimposed thereon, links connecting said frames, an operating handle having rearwardly extending spaced portions, a bolt connecting the portions, a shaft extending across the main frame and in the rear of said handle, operating connections between the bolt and the elevating frame and comprising bell crank levers with depending forwardly and rearwardly extending arms mounted loosely on the shaft, the forwardly extending arms having a detachable connection with the bolt and the rearwardly extending arms having a permanent connection with said links connected to the elevating frame, and means comprising a rearwardly extending hook also mounted on the shaft for retaining the elevating frame in a raised position and a forwardly extending arm connected to the hook and designed to be engaged by the operator for unlocking the elevating frame when this frame is to assume its lowered position.

11. In an elevating truck the combination with a wheel supported main frame, of an elevating frame pivotally connected thereto, a fixed shaft forward of the elevating frame, a pair of bell crank levers loosely mounted on said shaft, an operating handle having rearwardly extending arms, operative connecting means between the handle and the bell crank levers and including hook-shaped links designed for automatic attachment to the handle as the handle is moved rearwardly and for automatic detachment when the load has been elevated by a rearward movement of the handle, operating connecting means between the bell crank levers and the connecting means between the elevating frame and the main frame, and locking means also loosely mounted on the fixed shaft and comprising a bell crank lever, one arm having a hook to engage the elevating frame and the other arm extending forward and upward within easy reach of the operator for manually releasing the elevating frame as desired.

12. An elevating truck comprising a wheel supported base member, a frame pivotally connected to said member, an operating handle connected to said member, lever connecting means between the handle and the pivotally connected frame for elevating the frame, a bell crank lever for locking the frame in its elevated position, one arm of which is formed with a notch to engage a part of the frame, said notch having a forwardly projecting shoulder to act as a pushing device against said part to move the elevating frame past its raised center position for allowing the load to fall by gravity, the other arm of the bell crank lever designed to be depressed by the foot of the operator for the purpose described.

FELIX BLACKBURN.